United States Patent [19]

Stoeppelmann et al.

[11] Patent Number: 5,474,109
[45] Date of Patent: Dec. 12, 1995

[54] MULTILAYER CONDUIT HAVING A POLYESTER LAYER

[75] Inventors: Georg Stoeppelmann, Bonaduz; Bernhard Zeh, Trimmis, both of Switzerland

[73] Assignee: EMS-Inventa AG, Switzerland

[21] Appl. No.: 53,996

[22] Filed: Apr. 26, 1993

[30] Foreign Application Priority Data

Apr. 30, 1992 [DE] Germany .......................... 42 14 383.7

[51] Int. Cl.$^6$ ...................................................... F16L 9/14
[52] U.S. Cl. .......................................... 138/137; 138/137
[58] Field of Search ................................ 138/37, 39, 109, 138/119, 137, 141; 285/175, 176, 258; 428/36.91, 36.9

[56] References Cited

U.S. PATENT DOCUMENTS

| | | |
|---|---|---|
| 3,266,527 | 8/1966 | Ross ................................ 138/DIG. 1 |
| 3,584,656 | 6/1971 | Assendelet et al. .................... 138/137 |
| 4,299,256 | 11/1981 | Bachowski et al. .................... 138/137 |
| 4,303,457 | 12/1981 | Johansen et al. ....................... 138/137 |
| 4,762,589 | 8/1988 | Akiyama et al. ....................... 138/137 |
| 4,948,643 | 8/1990 | Mueller .................................. 138/137 |
| 5,219,003 | 6/1993 | Kerschbaumer ....................... 138/137 |
| 5,284,184 | 2/1994 | Noone et al. ........................... 138/137 |

*Primary Examiner*—James E. Bryant, III
*Attorney, Agent, or Firm*—Jordan B. Bierman; Bierman and Muserlian

[57] ABSTRACT

A multilayer polymer hose or pipe conduit which contains at least one barrier layer of polyester, which acts as a barrier to fuel being carried thereby. In a preferred form of the invention, the hose or conduit has an inner polyamide protective layer, an outer polyamide protective layer, an adhesion promotor layer between the barrier layer and the inner protective layer, and another adhesion layer between the barrier layer and the outer protective layer.

7 Claims, 2 Drawing Sheets

MULTILAYER CONDUIT HAVING A POLYESTER LAYER

This Application claims the benefit of priority of German Application P 42 14 383.7, filed Apr. 30, 1992.

The invention relates to a hose or pipe conduit for gaseous or liquid media, which consists of several polymer layers and exhibits an improved barrier effect.

BACKGROUND OF THE INVENTION

Pipe conduits and flexible tubes of polymers are known and are being used more and more frequently for cooling and brake fluids, as well as for fuel lines. In particular, fuel lines of polyamide, especially polyamide 11 or polyamide 12, belong to the state of the art which is discussed, for example, in "Kunststoffe und Elastomers in der Praxis" (Plastics and Elastomers in Practice), published by W. Kohlhammer, Stuttgart-Berlin-Koln-Mainz (1985).

A disadvantage of these polymer pipe conduits is that permeability of the usual fuels through their walls is undesirably high, particularly when the environmental protection and safety concerns that have arisen in recent years, are considered. Another disadvantage of such pipe conduits resides in the high absorption capacity of the polymers for some components of fuels; this leads to swelling and hence to changes in length of the conduits.

For these reasons, development work has been done to improve the so-called monopipes consisting of a single homogeneous layer of polyamide 11 or polyamide 12. One possibility is conversion to polymer multilayer pipes with special barrier layers of polymers.

From the patents DE 35 10 395 C2, DE 38 27 092 C1 and EP 428 834 A2, fuel lines of ethylene/vinyl alcohol copolymers as barrier layers are known. However, ethylene/vinyl alcohol copolymers having the desired barrier properties are extremely brittle and have very low elongations at break. For this reason, these polymers can be used only in small layer thicknesses. Moreover, when being processed by extrusion, specifically by coextrusion with thermoplastic polymers, these polymers are not thermostable at processing temperatures over 200° C. At these temperatures, crosslinkage of the polymer occurs, leading to gel particle formation. In foils, for which these ethylene/vinyl alcohol copolymers were developed, gel particle formation can be recognized immediately and leads to rejection for optical and aesthetic reasons. In thick-walled pipes with dyed polymers, gel particles are not visible, but diminish quality; thus, extremely stringent quality assurance requirements are necessary.

DE 38 21 723 C1 proposes a three-layer pipe with a continuous interior coating of polyolefin and external protective layers of polyamide. From the literature and permeability measurements, it is known that polyolefins form a good barrier against alcohols, and polyamides are a good barrier against hydrocarbons; however, fuels for motor vehicles often are mixtures of hydrocarbons and alcohols.

As is indicated by FIG. 1, the barrier values of the single polymer components cannot be applied to fuel blends or fuel mixtures and the permeability problem can therefore not be solved satisfactorily by a multilayer construction in which individual polymers have a good barrier effect against particular fuel components. Developments are also known wherein fluorine polymers are used as the barrier layer. However, these polymers are not only very expensive, but are difficult to process and to dispose of; moreover, they show little composite bonding in coextrusion processing.

SUMMARY OF THE INVENTION

It is, therefore, the object of the invention to provide a hose or pipe conduit which has a sufficiently low permeability for present environmental protection and safety regulations, without the above described disadvantages.

It has been found, surprisingly, that polyesters are excellent barriers to motor fuels. This blocking effect is unexpectedly high against pure hydrocarbons, pure alcohol, and their mixtures; the alcohol proportions can be varied over a relatively wide concentration range.

The multilayer hose or pipe conduits according to the invention have the advantages of 1. excellent processability of the polyesters and specifically of polybutylene terephthalate to form the barrier layer, and 2. excellent barrier effect of the polyesters and especially of polybutylene terephthalate with currently used motor fuels; the effect is superior to the ethylene-vinyl alcohol copolymers and the raw material costs are lower.

DETAILED DESCRIPTION OF THE INVENTION

Typical polyesters of the invention are polyethylene terephthalate (PET), polybutylene terephthalate (PBT), and polyethylene naphthalate (PEN). In addition to terephthalic acid, isophthalic acid is suitable as the polyester-forming component. Also block copolyether esters with polyether nonrigid segments can be used.

The lower hydrolysis stability of polyesters as compared to polyamide 11 or polyamide 12 is compensated for by multilayer conduits according to the present invention. Similarly, the lower impact toughness of PET or PBT—due to which an unmodified PET or PBT pipe does not pass the cold impact test according to SAE J 844 - can be avoided by the use of a multilayer pipe wherein at least one polyester-based barrier layer-has at least one protective layer of polyamide.

As the bonding between polyesters and polyamides is often insufficient, adhesion promoters are advantageously provided. Suitable are thermoplastically processable polymers which show, in the thermodynamic sense, at least partial compatibility with polyesters and polyamides. Especially suitable are polyurethanes, including both polyether and polyester urethanes. Similarly, polyamide elastomers, such as polyether polyamides, polyether ester polyamides, polyether ester ether polyamides, or mixtures thereof, can be used.

Other possible adhesion promoters are those polymers carrying functional groups which react with polyesters and polyamides. These include polyolefins grafted with maleic acid anhydride (MA), such as polyethylenes, polypropylenes, and copolyolefins grafted with MA, e.g. styrene-butadiene-styrene block copolymers or styrene-(ethylene-cobutylene)styrene block copolymers (Kraton G, from Shell). In addition to MA, dibutyl maleate or acrylic acid can be used as the grafting component. Furthermore, polymers functionalized with epoxide groups are effective adhesion promoters, and combinations of the above mentioned reactive groups are also useful.

The protective layers of the hose or pipe conduit according to the invention consist preferably of polyamide. As polyamides, polycondensates of aliphatic lactams or omegaaminocarboxylic acids with 4 to 44 carbon atoms, or polycondensates of aromatic omega-aminoacids with 6 to 20 carbon atoms, are used advantageously.

Equally suitable are condensates of at least one diamine and at least one dicarboxylic acid, each with 2 to 44 carbon atoms. Examples of such diamines are ethylene diamine, 1,4-diaminobutane, 1,6-diaminohexane, 1,10-diaminodecane, 1,12-diaminododecane, meta- and para-xylylenediamines, cyclohexyldimethylamine, and bis-(p-aminocyclohexyl)-methane and its lower alkyl derivatives. Examples of dicarboxylic acids are succinic, glutaric, adipic, pimelic, suberic, azelaic, sebacic, dodecanedicarboxylic, 1,6-cyclohexanedicarboxylic, terephthalic, isophthalic, and naphthalenedicarboxylic acids.

The polyamides according to the invention may contain the usual additives such as UV and heat stabilizers, crystallization accelerators, plasticizers, fire retardants, lubricants, inorganic fillers, and additives which increase electric conductivity. In a specific embodiment, the outer protective layer may consist of polyethylene terephthalate or the inner protective layer may be of polyolefin, preferably polyolefin modified with functional groups.

Clearly, lower permeability values are found in the conduits of the invention than in multilayer pipes which contain polyvinyl alcohol as barrier layer; this is especially true for alcohol-containing gasolines. The conduits are chemically stable to common fuels, motor oils, acids used in the automotive sector, de-icing salts, and zinc chloride. The hose and pipe conduits according to the invention resist oxidation processes by corrosive fuels (sour gas) and are stable to elevated temperature and radiation. They have a good impact toughness even at low temperatures, so that they pass the impact test according to SAE J 844 at $-40°$ C. The bursting pressure also meets the standards applicable to gasoline conduits. The conduits can be deformed by heat, owing to which even complicated geometric arrangements are easily accessible.

Examples of variations in layer construction from inside to outside are:
PA/PUR/PBT
PA/PUR/PBT/PUR/PA
PBT/PUR/PA
PO/PO grafted/PA/PUR/PBT
PO/PBT
PO/PBT/PUR/PA In the above Table,
PA=polyamide
PUR=polyurethane
PBT=polybutyleneterephthalate
PO=polyolefin Preferred embodiments of the hose or pipe conduit according to the invention are 3- or 5-layer conduits which have an inner and/or outer protective layer of polyamide, preferably PA 12, and a barrier layer of polybutylene terephthalate; they include, for each polyamide layer, an adhesion promoter layer, preferably of polyurethane. In most preferred embodiments, the barrier layer is the inner layer because it is a barrier to the individual fuel components.

The layer thickness of the hose or pipe conduit according to the invention is not critical. Preferred are:
Protective layers of 0.2–0.6 mm
barrier layers of 0.2–0.7 mm
adhesion promoter layers of 0.05–0.3 mm It is especially advantageous that the barrier layer can, without complications in manufacture and use, have a thickness of up to 2.0 mm. It is, however, of special advantage, that the hose or pipe conduit according to the invention can, because of the improved barrier effect, be produced with thinner wall thicknesses and hence more cost-efficiently than the conduits according to the prior art.

Also it is possible to provide the wall of the hose or pipe conduit with annular or spiral corrugations, and to make the protective layers antistatic, impact resistant, or to modify them with plasticizers and/or other additives according to the prior art. They can also be made length-stable by addition of glass or similar fibers.

The materials used in the Examples and tests are
Polybutylene terephthalate: GRILPET XE3060 (EMS-CHEMIE AG)
Polyester urethane: DESMOPAN 588 (BAYER AG)
Plasticized PA 12: GRILAMID L25W40X (EMS-CHEMIE AG)
Plasticized PA 6: GRILON R47HW (EMS-CHEMIE AG)
Polyvinyl alcohol: EVAL EC-F (KURARAY)
Adhesion promoter PP, MSA grafted: XE 3153 (EMS-CHEMIE AG)
Polypropylene: Novolen 1300E (BASF)
Low density polyethylene: LDPE 150 (DOW PLASTICS)
L25: Grilamid PA 12 natural (EMS-CHEMIE)
PA 6: Grilon F 40 natural (EMS-CHEMIE)
MXDA 6: Polyamide based on m-xylylenediamine and adipic acid (Mitsubishi KAS CHEMICAL)

The permeability measurements were performed with a dynamic measuring arrangement at 60° C. and under a pressure of 4 bar. The conduits according to the present invention were tested in accordance with DIN 51604 B and fuel FAM B was used. This consists of 42.25% toluene, 25.35% isooctane, 12.68% diisobutylene, 4.23% ethanol, 15% methanol, and 0.5% water, all percentages being by volume.

In addition, M35 was also tested. The results in $g/m^2/h$ impressively document the superiority of polybutylene terephthalate of type XE 3060 alone (Comparison Example 3) and in multilayer constructions (Examples 1 and 2). For permeability tests on films of 50 μ thickness according to DIN 51604A, fuels FAM A, M35 (Halterman Normbenzin with 35% by volume methanol), and methanol alone were used. FAMA is a mixture of 50% toluene, 30% isooctane, 15% diisobutylene, and 5% ethanol, all percentages being by volume.

BRIEF DESCRIPTION OF THE DRAWING

In the accompanying drawing, constituting a part hereof, and in which like reference characters indicate like parts.

Figure 1:
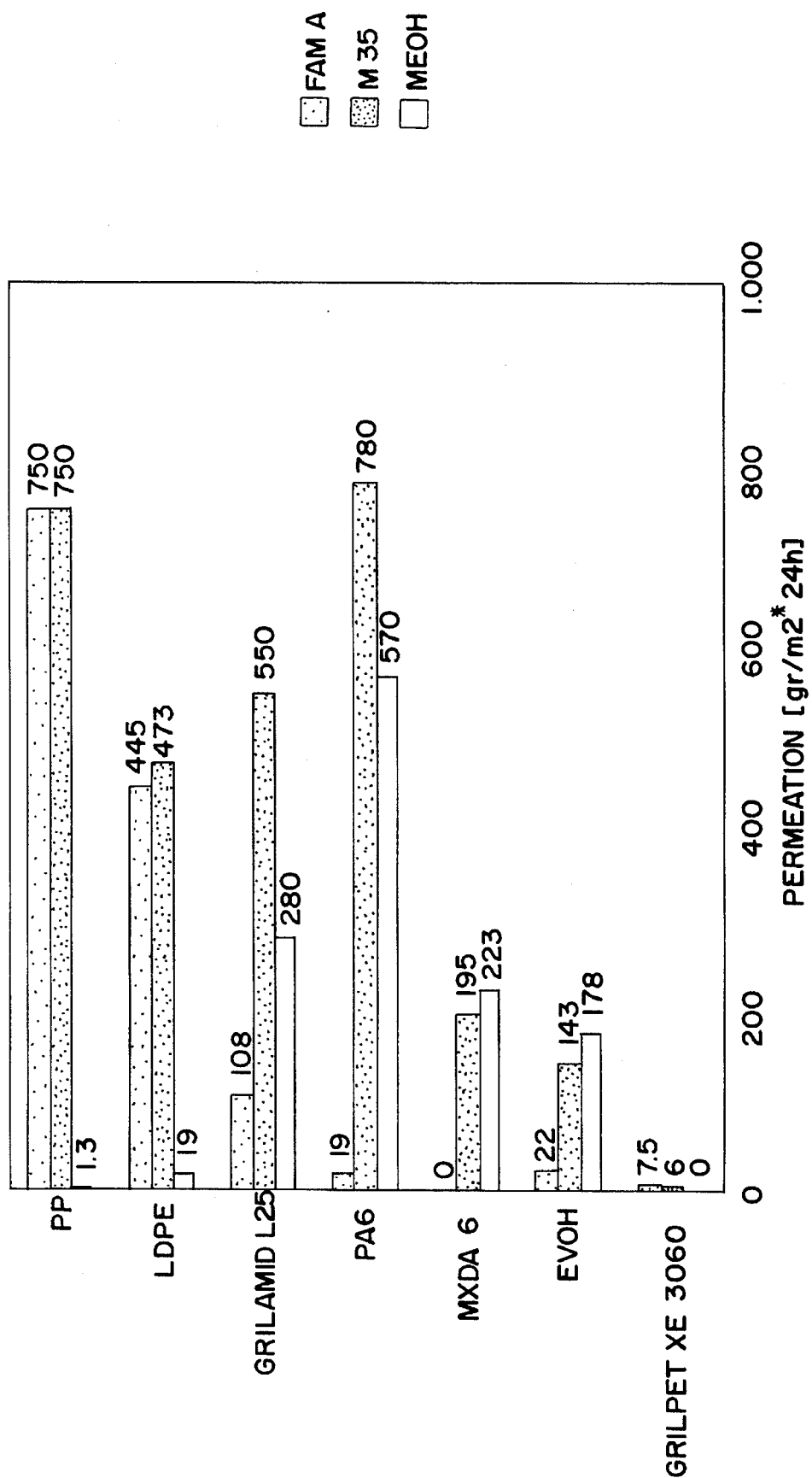
FIG. 1 shows graphs of permeability values of FAM A, M35, and pure methanol with respect to various polymer films in tests according to DIN 51604A.
Figure 2:
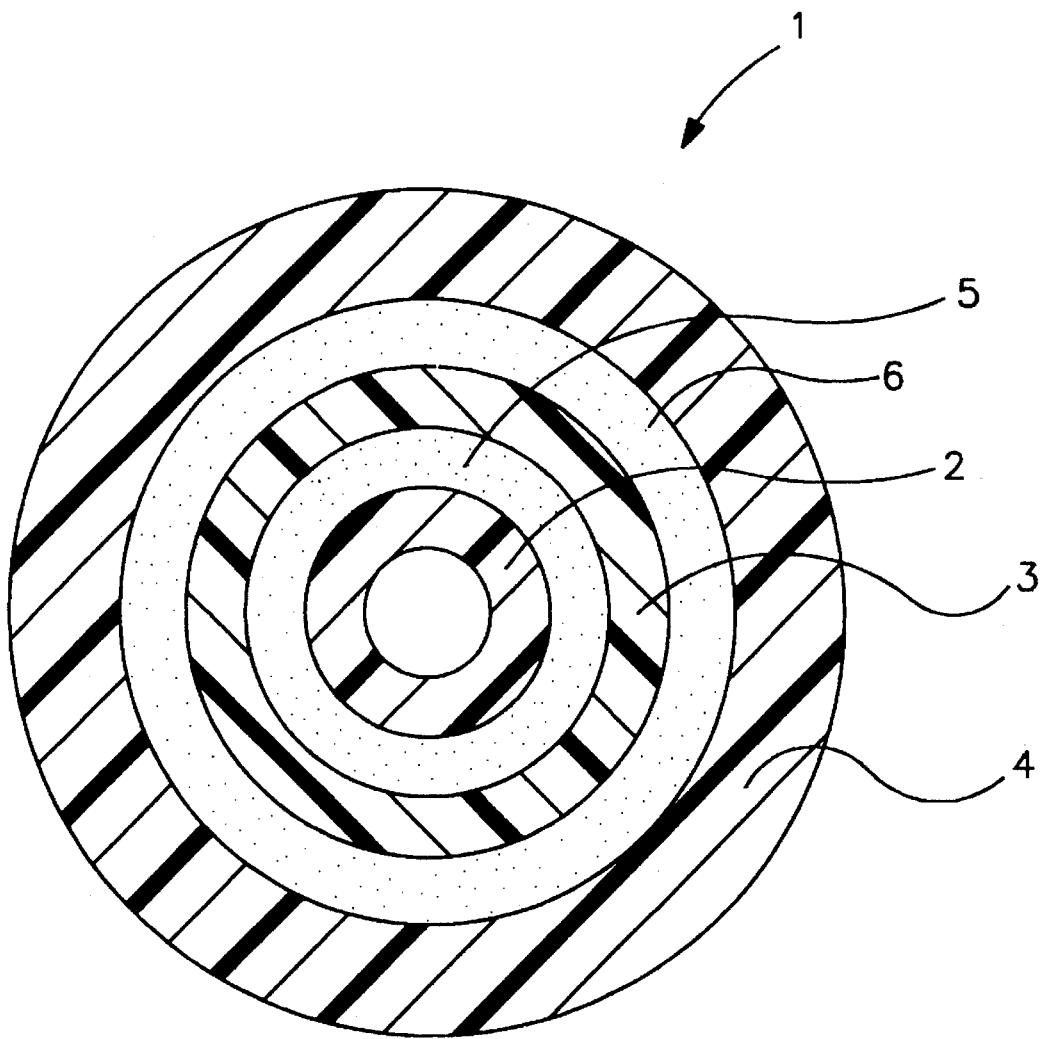
FIG. 2 is a sectional view of one embodiment of the invention.

Conduit 1 comprises inner layer 2, barrier layer 3, and protective layer 4, Adhesive layer 6 is at the interface of barrier layer 3 and protective layer 4; similarly, adhesive layer 5 is between inner layer 2 and barrier layer 3.

EXAMPLE 1

The conduit of this Example has an inner layer of XE 3060 which is 0.6 mm thick. The center layer is of DESMOPAN 588 and is 0.1 mm thick. The outer layer is of L25W40X (PA 12) and is 0.3 mm thick. The total diameter of the pipe is 8 mm.

EXAMPLE 2

The inner layer is 0.3 mm thick and made of L25W40X (PA 12), the center layer is DESMOPAN 588 and is 0.1 mm thick. The outer layer is XE 3060, 0.6 mm thick. The total diameter is 8 mm. In essence, the inner layer of Example 1 is the outer layer of Example 2 and the outer layer of Example 1 is the inner layer of Example 2.

COMPARATIVE EXAMPLE 1

This is a mono pipe of L25W40X (PA 12) which is 1 mm thick and has a diameter of 8 mm.

COMPARATIVE EXAMPLE 2

This Example is in accordance with German Patent 35 10 395. It consists of five layers totaling 1 mm in thickness and has a diameter of 8 mm. From the inside out, the layers are 0.45 mm R47HW (PA 6), 0.15 mm EVAL EC-F, 0.05 mm R47HW, 0.05 mm XE 3153, and 0.3 mm L25W40X (PA 12).

COMPARATIVE EXAMPLE 3

This is a mono pipe made of XE 3060 (PBT) and is 8 mm in diameter and has a wall thickness of 1 mm. It is in accordance with the invention except that there is only one layer.

The permeabilities of the foregoing embodiments were determined and the results are set forth in Table 1.

TABLE 1

| | Permeability [$g/m^2/h$] FAM B | Permeability [$g/m^2/h$] HALTERMANN/35% MEOH |
|---|---|---|
| Example 1 | 1.1 | 1.1 |
| Example 2 | 2.1 | 2.2 |
| Comparison Example 1 | 22.8 | 33.0 |
| Comparison Example 2 | 5.1 | 5.6 |
| Comparison Example 3 | 0.8 | 1.4 |

While only a limited number of specific embodiments of the present invention have been expressly disclosed, it is, nonetheless, to be broadly construed and not to be limited except by the character of the claims appended hereto.

What we claim is:

1. A multilayer, coextruded polymer hose or pipe conduit having at least one barrier layer of polybutylene terephthalate, whereby said hose or conduit exhibits a barrier effect to alcohols, aliphatic hydrocarbons, and aromatic hydrocarbons, there being at least one adhesion promoter layer adjacent at least one said barrier layer, said adhesion promoter layer comprising at least one polyurethane.

2. The hose or conduit of claim 1 wherein said polyurethane is selected form the group consisting of polyether urethanes, polyester urethanes, and mixtures thereof.

3. The hose or conduit of claim 1 wherein said barrier layer is an inner layer.

4. The hose or conduit of claim 1 which is a 3-layer conduit comprising a polybutylene terephthalate layer, a protective polyamide layer, and an adhesion promoter layer therebetween.

5. The hose or conduit of claim 1 which is a 5-layer conduit with an inner layer and an outer layer of polyamide, said barrier layer of polybutylene terephthalate between two adhesion promoter layers, one of said adhesion promotor layers being between said barrier layer and said inner layer, and another of said adhesion promotor layers being between said barrier layer and said outer layer.

6. The hose or conduit of claim 1 wherein there is at least one protective layer of polyamide.

7. The hose or conduit of claim 1 wherein there is provided at least one inner protective layer or one outer protective layer of polyamide, said adhesion promoter layer being between said polybutylene terephthalate and either said inner protective layer or said outer protective layer.

* * * * *